(12) United States Patent
Willingham

(10) Patent No.: US 11,406,084 B2
(45) Date of Patent: Aug. 9, 2022

(54) SPINNABLE EDIBLE PET TREAT

(71) Applicant: Lee Bob Willingham, Mount Vernon, IL (US)

(72) Inventor: Lee Bob Willingham, Mount Vernon, IL (US)

(*) Notice: Subject to any disclaimer, the term of this patent is extended or adjusted under 35 U.S.C. 154(b) by 199 days.

(21) Appl. No.: 16/813,716

(22) Filed: Mar. 9, 2020

(65) Prior Publication Data

US 2020/0281161 A1 Sep. 10, 2020

Related U.S. Application Data

(60) Provisional application No. 62/816,091, filed on Mar. 9, 2019.

(51) Int. Cl.
*A01K 15/02* (2006.01)

(52) U.S. Cl.
CPC .................. *A01K 15/026* (2013.01)

(58) Field of Classification Search
CPC ...... A01K 15/026; A01K 15/025; A63H 1/10; A63H 1/30; A63H 1/32
See application file for complete search history.

(56) References Cited

U.S. PATENT DOCUMENTS

| | | | |
|---|---|---|---|
| 6,217,408 B1* | 4/2001 | Willinger | A01K 15/025 119/707 |
| 2015/0136040 A1* | 5/2015 | Hutton | A01K 15/025 119/709 |
| 2019/0069521 A1* | 3/2019 | Hutton | A23K 20/30 |
| 2019/0098864 A1* | 4/2019 | Simon | A01K 15/025 |
| 2019/0261601 A1* | 8/2019 | Stone | A01K 5/02 |

FOREIGN PATENT DOCUMENTS

KR 200450309 Y1 * 9/2010

* cited by examiner

*Primary Examiner* — Trinh T Nguyen
(74) *Attorney, Agent, or Firm* — Patrick L. Mixon

(57) ABSTRACT

A dog treat is disclosed that is rotates on a central hub to encourage interaction between the dog and the treat. The dog treat includes a platform of material from which multiple wall segments vertically project. Each wall segment contains the same mass of material and are equidistant from the other. The platform of material may include concentric walls therein, where each wall is of varying width. The dog treat is capable of being spun on its central hub.

25 Claims, 4 Drawing Sheets

SPINNABLE EDIBLE PET TREAT

RELATED APPLICATIONS

The present invention claims priority to U.S. Provisional Application No. 62/816,091, filed Mar. 9, 2019, the contents of which are incorporated herein.

FIELD OF INVENTION

This invention relates to a n edible pet treat. More specifically, the present invention relates to a spinnable pet treat that promotes increased interaction between treat and pet.

BACKGROUND OF THE INVENTION

Sales of dog food and dog treats make up nearly fifty percent of all revenues counted in the pet industry. The act of feeding treats to a dog has been shown to enhance the dog ownership experience. Dog owners enjoy feeding their dogs treats as a reward for performing a task. In return, dogs show their pet owners more affection. The more the dog enjoys the dog treat (e.g., his favorite treat), the more affection the dog will show.

What is needed is a way to make the dog's dog treat experience even more enjoyable. Although dog treats have a positive effect on the pet owner and dog interaction, conventional dog treats are shaped in such a way that it neglects an important part of the interaction. Namely, conventional dog treats are shaped like bones, or square or rectangular nuggets. Consequently, conventional dog treats will lay static on the floor and do not enhance the interaction between pet and dog treat. When the treat is placed on the floor, it gives the dog no additional enjoyment above picking up the treat to eat it. What is needed is a dog treat that will increase the dog's treat enjoyment by enhancing the interaction between dog and treat.

BRIEF SUMMARY OF THE INVENTION

The present invention is a dog treat that is capable of being spun on its central hub to increase the interaction between dog and treat. The dog treat of the present invention is comprised of edible material. The edible material may be comprised of a solid edible material that is safe for the dog to consume. In one aspect, the dog treat of the present invention may be composed of a single composite material.

In one aspect, the dog treat includes multiple wall segments. The wall segments may be equidistant from the dog treat central hub. The wall segments may be formed perpendicular to the dog treat's platform of the material adjacent to the central hub. In one aspect, the wall segments may be formed to ensure that the dog treat rotates without wobble. By wobble what is meant is that, when spun or rotated, the dog treat is able of freely rotating on a hub of material without support.

In yet another aspect, the dog treat includes an inner portion (e.g., a portion confined by the wall segments that may include multiple concentric walls. In one aspect each wall may have the same shape as every other concentric wall. In another aspect, a first one of the multiple concentric walls may include a different shape than a second of one the concentric walls.

BRIEF DESCRIPTION OF DRAWINGS

A more complete understanding of the present invention may be derived by referring to the various embodiments of the invention described in the detailed descriptions and drawings and figures in which like numerals denote like elements, and in which.

DETAILED DESCRIPTION OF THE PREFERRED EMBODIMENTS

Figure 1:
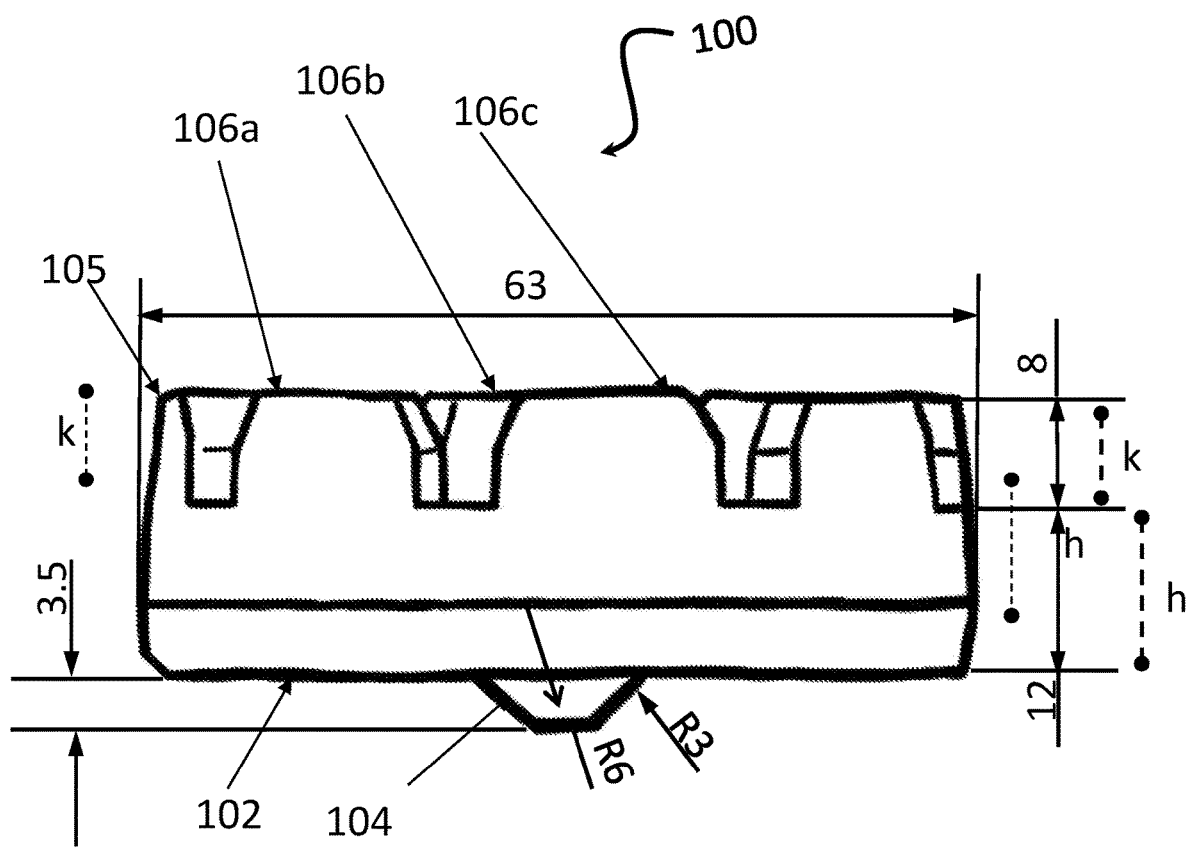
FIG. 1 is a side view of a spinnable pet treat in accordance with various exemplary embodiments of the present invention.

The brief description of exemplary embodiments of the invention herein makes reference to the accompanying drawings, which illustrate various exemplary embodiments of the invention and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the description herein is presented for purposes of illustration only and not of limitation.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper", "front", "rear", "back", "top", "bottom", and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments may be described herein with reference to cross-sectional or block diagram illustrations that are schematic illustrations of idealized exemplary embodiments (and intermediate structures). As such, variations from the shapes of the illustrations as a result, for example, of manufacturing techniques and/or tolerances, are to be expected. Block components illustrate the relationship between components. Thus, exemplary embodiments should not be construed as limited to the particular shapes of regions illustrated herein, but are to include deviations in shapes that result, for example, from manufacturing.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It also will be understood that when an element is referred to as being "on", "in communication with", or "connected" or "coupled" to another element, it can be directly on or connected or coupled to the other element or intervening elements can be present, and may further include commonly understood electrical or mechanical connections. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

It should also be understood that although the present invention is described with respect to a dog treat, this is by illustration only. The present invention may be embodied in treats for other companion animals.

FIG. 1 depicts an exemplary embodiment of pet treat 100 constructed in accordance with the invention. In one exemplary embodiment, pet treat 100 molded as a single, homogeneous, one-piece molded treat. Pet treat 100 may be round or circular in shape. In one embodiment, pet treat 100 may be dish shaped. In another exemplary embodiment, pet treat 100 may be circular in shape. Pet treat 100 may be formed from edible material. By edible, what is meant is that the material is suitable for animal consumption. Pet treat 100 may require no assembly.

Pet treat 100 may include a hub 104 serving as the central point around which the predominant mass 102 is radially formed. Hub 100 may include an axis point around which predominate mass 102 rotates. Predominate mass 102 (also called platform 102) may be a platform of edible material having a thickness, h. Predominate mass 102 may include a wall 105 formed along its perimeter. As used herein, hub 104 may project from the bottom of platform 102. In this way, hub 104 may facilitate rotation of platform 102 when hub 104 is placed in contact with a flat surface.

In another embodiment, a wall 105 is formed substantially perpendicular to platform 102. Wall 105 may have a predetermined height, k. In another exemplary embodiment, wall 105 may be segmented into several distinct equally proportioned wall segments 106a, 106b, and 106c. By equally proportioned, what is meant is that each wall segment 106a includes the same mass as wall segment 106b. Similarly, wall segment 106b includes the same mass as segment 106c, and wall segment 106a has the same mass of material as wall segment 106c.

In another embodiment, wall segments 106a, 106b, and 106c may be of different shapes, so long as each distinct wall segment contains the same mass of material. In another embodiment, wall segments 106a, 106b, and 106c may be of different shapes, so long as each distinct wall segment contains the same density of material. That is, each wall segment has equal mass as the other wall distinct segments. In still another exemplary embodiment, wall segments 106a, 106b, and 106c are all equal distant from the other. In yet another embodiment, wall segments 106a, 106b, and 106c are of substantially equal size, shape, and density. In yet another embodiment, wall 105 has an even number of wall segments. In yet another embodiment, wall 105 has an odd number of segments. In yet another embodiment, every second wall segment is substantially similar in shape, and density as a first wall segment.

Figure 2:
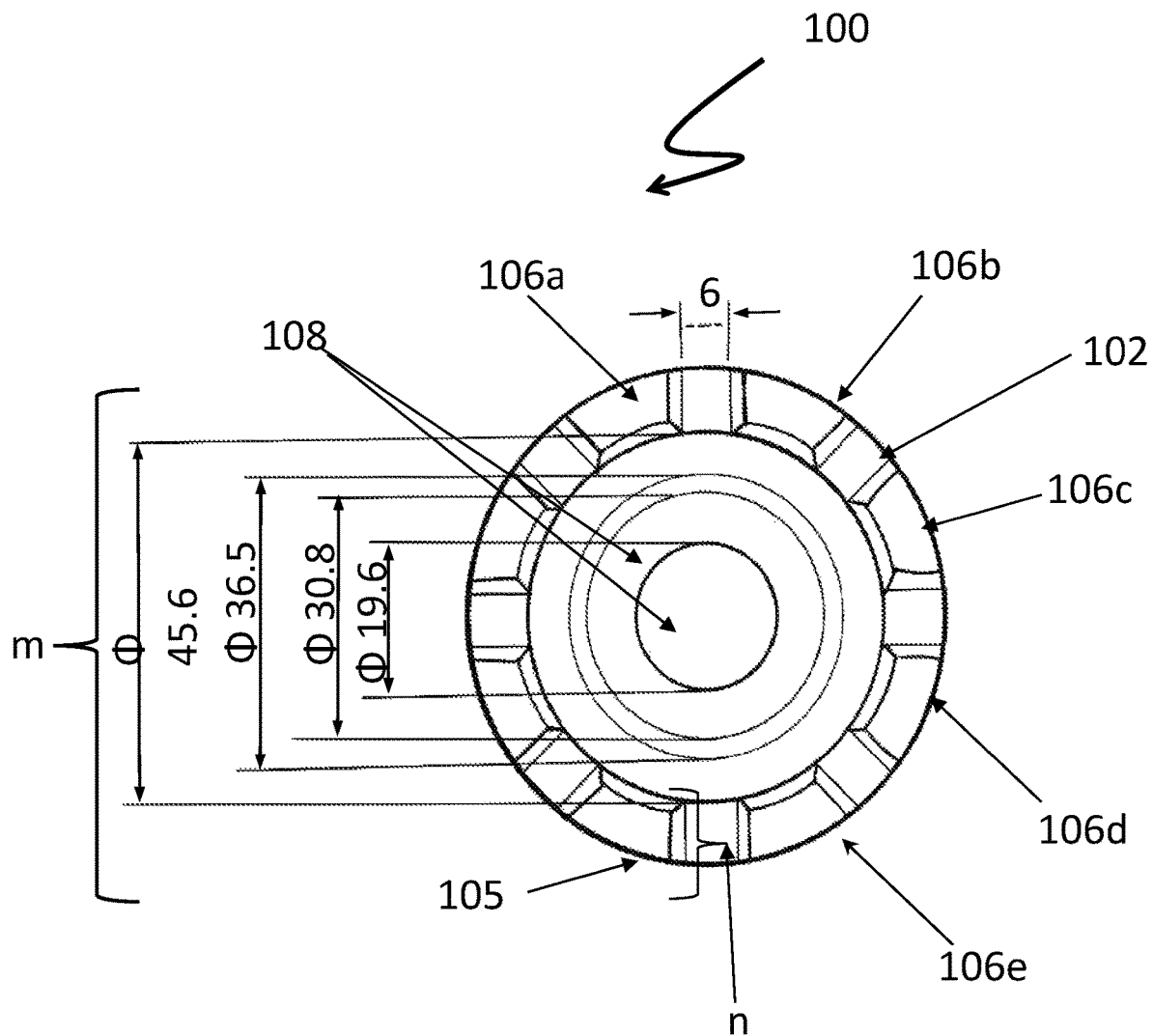
FIG. 2 is a top view of the spinnable pet treat in accordance with various exemplary embodiments of the present invention.

FIG. 2 shows an overhead depiction of pet treat 100. As shown, pet treat 100 is depicted circular in shape. Wall 105 may have a width, n. Wall segments 106a, 106b, 106c, 106d, 106e are all substantially equal in size and shape. Additionally, wall segments 106a, 106b, 106c, 106d, 106e are depicted substantially equal distant, f, apart one from the other.

In another embodiment, also shown in FIG. 2, platform 106 includes an inner area 108 that is defined by the inner perimeter of wall 105. Inner area 108 may be formed in gradients. That is, the thickness of platform 102 at inner area 108 directly above hub 104 may be thinner than the thickness of the platform in substantial abutment with the inner perimeter of wall 105 is thicker than the material above hub 104. In another exemplary embodiment, inner area 108 may include concentric walls (e.g., ridges), wherein the amount of material comprising an inner most portion of inner area 108 comprises a first concentric wall, and wherein a concentric second wall is in proximity to the first wall, and wherein the second wall may thicker than the first wall. As shown, inner area 108 may include multiple concentric walls, each of different thickness, m.

Figure 3:
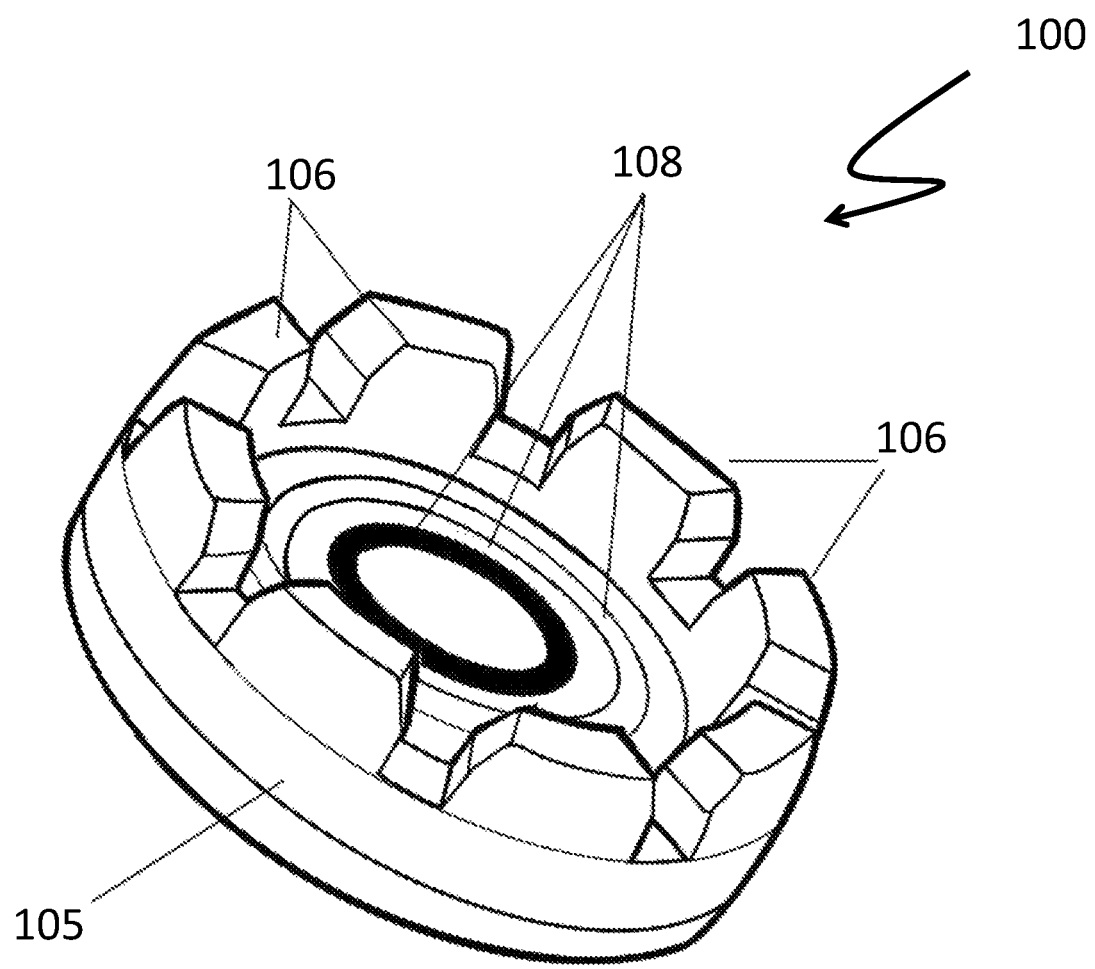
FIG. 3 is a perspective view of the spinnable pet treat in accordance with various exemplary embodiments of the present invention.
Figure 4:
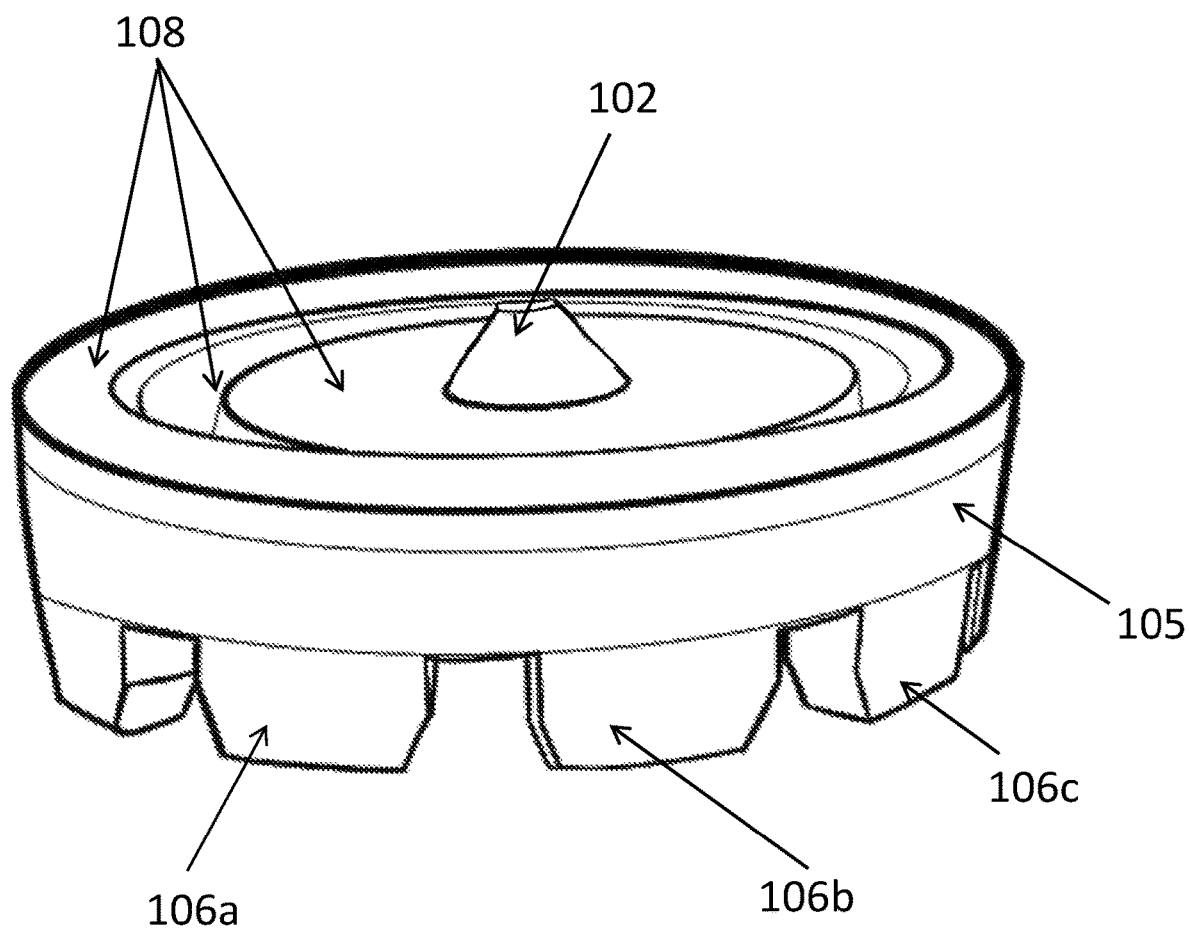
FIG. 4 is a perspective view of the underside of the spinnable pet treat in accordance with various exemplary embodiments of the present invention.

FIG. 3 is a perspective view of pet treat 100 in accordance with the present invention. As can be seen, wall segments 106 are equidistant apart. It can further be seen that the inner area may include concentric walls 108. FIG. 4 is a perspective view of the underside of the spinnable pet treat in accordance with various exemplary embodiments of the present invention.

During operation, pet treat 100 in set in angular motion. That is, a pet owner may place pet treat 100 in contact with a flat surface. Specifically, the pet owner would place the pet treat 100 on the floor with the hub 104 in abutment with the flat surface. In this way, hub 1044 may include additional material such that it protrudes from the bottom of platform 102. In this way, the pet owner may place hub 104 in contact with a flat surface and rotate pet treat 100 on hub 104 by causing pet treat 100 to experience angular motion. By causing pet treat 100 to spin, the pet owner is encouraging further engagement between the pet and the treat. Such interaction increases the pet's enjoyment and the affection the pet will show the pet owner.

It should be appreciated by one skilled in art, that the foregoing description has been directed to specific embodiments of this invention. It will be apparent, however, that other variations and modifications may be made to the described embodiments, with the attainment of some or all of their advantages. Therefore, it is present invention to cover all such obvious variations and modifications within the true spirit and scope of the invention.

I claim:

1. A spinnable pet treat comprising a single homogeneous edible material, including,
   i. circular platform of edible material, wherein the circular platform includes a central axis, a circular platform diameter, a circular platform top surface, and a circular platform bottom surface,
   ii. multiple wall segments in communication with the perimeter of the circular platform, wherein the multiple wall segments project upwardly and perpendicular to circular platform, wherein each of the multiple wall segments comprises the equivalent mass of material, and wherein each of the multiple wall segments is spaced equidistant one from another, iii.

iv. a first concentric wall formed in the circular platform top surface, the first concentric wall having a first concentric wall diameter, wherein the first concentric wall diameter is less than the circular platform diameter, and wherein first concentric wall central axis is congruent with the circular platform central axis.

2. The spinnable pet treat of claim 1, further comprising a second concentric wall formed in the circular platform top surface, the second concentric wall having a second concentric wall diameter, wherein the second concentric wall diameter is less than the first concentric wall diameter, and wherein second concentric wall central axis is congruent with the circular platform central axis.

3. The spinnable pet treat of claim 2, wherein a first one of the multiple wall segments includes equivalent mass of material to a second one of the multiple wall segments.

4. The spinnable pet treat of claim 3, wherein the multiple wall segments are spaced equidistant apart.

5. The spinnable pet treat of claim 4, wherein each of the multiple wall segments includes the same shape.

6. The spinnable pet treat of claim 5, further including a material hub on the bottom surface of the circular platform, wherein the material hum is positioned on the central axis of the circular platform.

7. The spinnable pet treat of claim 6, wherein the total number of the multiple wall segments is even.

8. The spinnable pet treat of claim 7, wherein the total number of the multiple wall segments is odd.

9. The spinnable pet treat of claim 8, wherein circular platform bottom surface includes a concentric canal formed in the circular platform bottom surface, the circular platform bottom surface canal having a circular platform bottom surface concentric canal central axis, wherein the circular platform bottom surface concentric canal central axis is congruent with the circular platform central axis.

10. A spinnable pet treat comprising a single homogeneous edible material, including, i. circular platform of edible material, wherein the circular platform includes a central axis, a circular platform diameter, a circular platform top surface, and a circular platform bottom surface, ii. multiple wall segments in communication with the perimeter of the circular platform, wherein the multiple wall segments project upwardly and perpendicular to circular platform, wherein each of the multiple wall segments comprises the equivalent mass of material, and wherein each of the multiple wall segments is spaced equidistant one from another, and iii. a first concentric wall formed in the circular platform top surface, the first concentric wall having a first concentric wall diameter, wherein the first concentric wall diameter is less than the circular platform diameter, and wherein first concentric wall central axis is congruent with the circular platform central axis.

11. The spinnable pet treat of claim 10, wherein a first one of the multiple wall segments includes equivalent mass of material to a second one of the multiple wall segments.

12. The spinnable pet treat of claim 11, wherein the multiple wall segments are spaced equidistant apart.

13. The spinnable pet treat of claim 12, wherein each of the multiple wall segments have the same shape.

14. The spinnable pet treat of claim 13, further including a material hub on the bottom surface of the circular platform, wherein the material hub is positioned on the circular platform central axis.

15. The spinnable pet treat of claim 14, wherein the total number of the multiple wall segments is even.

16. The spinnable pet treat of claim 15, wherein the total number of the multiple wall segments is odd.

17. The spinnable pet treat of claim 16, wherein circular platform bottom surface includes a concentric canal formed in the circular platform bottom surface, the circular platform bottom surface canal having a circular platform bottom surface concentric canal central axis, wherein the circular platform bottom surface concentric canal central axis is congruent with the circular platform central axis.

18. A spinnable pet treat comprising a single homogeneous edible material, including, i. circular platform of edible material, wherein the circular platform includes a central axis, a circular platform diameter, a circular platform top surface, and a circular platform bottom surface ii. multiple wall segments in communication with the perimeter of the circular platform, wherein the multiple wall segments project upwardly and perpendicular to circular platform, and iii. a first concentric wall formed in the circular platform top surface, the first concentric wall having a first concentric wall diameter, wherein the first concentric wall diameter is less than the circular platform diameter, and wherein first concentric wall central axis is congruent with the circular platform central axis, iv. a second concentric wall formed in the circular platform top surface, the second concentric wall having a second concentric wall diameter, wherein the second concentric wall diameter is less than the first concentric wall diameter, and wherein second concentric wall central axis is congruent with the circular platform central axis.

19. The spinnable pet treat of claim 18, wherein a first one of the multiple wall segments includes equivalent mass of material to a second one of the multiple wall segments.

20. The spinnable pet treat of claim 18, wherein the multiple wall segments are spaced equidistant apart.

21. The spinnable pet treat of claim 20, wherein each of the multiple wall segments have the same shape.

22. The spinnable pet treat of claim 21, further including a material hub on the bottom surface of the circular platform, wherein the material hub is positioned on the circular platform central axis.

23. The spinnable pet treat of claim 22, wherein the total number of the multiple wall segments is even.

24. The spinnable pet treat of claim 23, wherein the total number of the multiple wall segments is odd.

25. The spinnable pet treat of claim 24, wherein circular platform bottom surface includes a concentric canal formed in the circular platform bottom surface, the circular platform bottom surface canal having a circular platform bottom surface concentric canal central axis, wherein the circular platform bottom surface concentric canal central axis is congruent with the circular platform central axis.

* * * * *